United States Patent
Tsao (10) Patent No.: US 9,467,513 B2
(45) Date of Patent: *Oct. 11, 2016

(54) METHOD AND APPARATUS FOR WEB BASED STORAGE ON-DEMAND

(71) Applicant: Sheng Tai (Ted) Tsao, Fremont, CA (US)

(72) Inventor: Sheng Tai Tsao, Fremont, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 457 days.

This patent is subject to a terminal disclaimer.

(21) Appl. No.: 14/038,325

(22) Filed: Sep. 26, 2013

(65) Prior Publication Data

US 2015/0089036 A1 Mar. 26, 2015

Related U.S. Application Data (60) Continuation of application No. 13/916,445, filed on Jun. 12, 2013, now Pat. No. 8,903,963, which is a continuation of application No. 12/944,958, filed on Nov. 12, 2010, now Pat. No. 8,473,596, which is a division of application No. 12/013,813, filed on Jan. 14, 2008, now Pat. No. 8,639,788, which is a division of application No. 10/713,905, filed on Aug. 12, 2002, now Pat. No. 7,379,990, said application No. 12/944,958 is a continuation-in-part of application No. 12/079,482, filed on Mar. 27, 2008, now Pat. No. 8,566,463, which is a division of application No. 10/713,904, filed on Aug. 6, 2002, now Pat. No. 7,418,702.

(60) Provisional application No. 60/402,626, filed on Aug. 12, 2002.

(51) Int. Cl.
*G06F 15/16* (2006.01)
*H04L 29/08* (2006.01)

(52) U.S. Cl.
CPC ........... *H04L 67/1097* (2013.01); *H04L 67/02* (2013.01)

(58) Field of Classification Search
CPC ....................................... H04L 67/02
USPC ....................................... 709/223
See application file for complete search history.

(56) References Cited

U.S. PATENT DOCUMENTS

2003/0182422 A1* 9/2003 Bradshaw ......... G06F 17/30082
709/225
2008/0165681 A1* 7/2008 Huang ................ H04L 12/185
370/230

* cited by examiner

*Primary Examiner* — Adnan Mirza (57) ABSTRACT

The operation efficiency of a large scale distributed computing system in a world wide web environment is critical to any enterprises, ISP, or ASP due to a larger number of individual computing units in the distributed computing system are required to be operated. A multi-layered server structure with deployment of middle level control server for the distributed computing system of this invention can lead to a more secure and efficient computing environment for managing and access the larger number of computing units in the distributed computing system due to the middle level control server can effectively shared the burden of controlling the larger number of the computing units from a centralized control server of the distributed computing system.

20 Claims, 10 Drawing Sheets

Distributed Virtual SAN Infrastructure

The UDP packet format used by "Virtual SAN Auto Configuration Protocol"

Fig. 4

Example of Storage Volume Information of an IP SAN Unit

Note: Each volume may further be partitioned into small chunk of partition.

Direct Attached Storage System:

Fig. 7

In-Band Accessed Virtual SAN

Fig. 8

Central Controlled Distributed Scalable Virtual Machine Infrastructure

Fig. 9

Recovery Scheme of the Distributed Virtual SAN Infrastructure

Fig. 10

The typical hardware components of a computer system such as for a control management system, system units including storage units, host, and console host:

METHOD AND APPARATUS FOR WEB BASED STORAGE ON-DEMAND

CROSS-REFERENCE TO RELATED APPLICATION(S)

The present application is a continuation of the U.S. patent application Ser. No. 13/916,445 filed on Jun. 12, 2013 and now a U.S. Pat. No. 8,903,963 which itself is a continuation of U.S. patent application Ser. No. 12/944,958 filed on Nov. 12, 2010 now a U.S. Pat. No. 8,473,596 which itself is a division of a U.S. patent application Ser. No. 12/013,813 filed on Jan. 14, 2008 and now a U.S. Pat. No. 8,639,788 which in turn itself is a division of U.S. patent application Ser. No. 10/713,905 filed on Aug. 12, 2002 and now is a U.S. Pat. No. 7,378,990. The application Ser. No. 12/944,958 also is a continuation-in-part (CIP) of US parent application Ser. No. 12/079,482 filed on Mar. 27, 2008 and now a U.S. Pat. No. 8,566,463 which itself is a divisional of U.S. patent application Ser. No. 10/713,904 filed on Aug. 6, 2002 and now is a U.S. Pat. No. 7,418,702. All above mentioned applications are incorporated by reference herein in their entirety for all purpose.

FIELD OF THE INVENTION

This invention generally relates to computer communications network. More specifically, this invention relates to web based data storage systems.

BACKGROUND OF THE INVENTION

Figure 7:
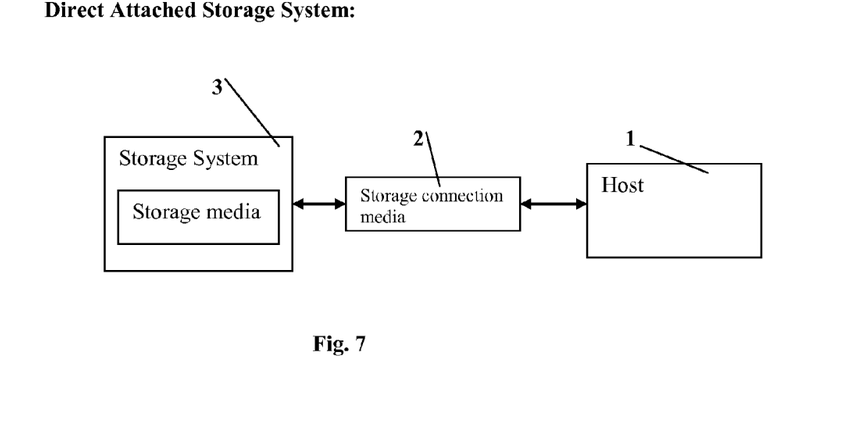
FIG. 7 is a conventional Direct Attached Storage System.

Today's corporate IT professionals typically face many challenges to handle the ever increasing information and data. To handle large amount of data, many organizations is required to expand their storage capacity and manage storage systems locally in order to maintaining their normal business operating. A conventional approach is to use IP based network attached storage ("NAS"), which effectively provides data storage to service for end users. Moreover, at the enterprise level, the majority storage systems are directly attached or connected to server(s) or host(s) as shown in FIG. 7. These server(s) and/or host(s) are typically access storage devices through conventional communication connection media, such as traditional IDE, SCSI, or Fiber Channel.

The server, which is directly attached to a storage system as illustrated in FIG. 7 typically has many drawbacks, which are described as following:

a typical conventional storage management system is only capable of handling 4 TB (terabytes) of data, which is usually not good enough for an enterprise storage system;

The most of servers, which are directly attached to storage systems, have problems for further expanding their storage capacity. For example, it may require to purchase new servers or require shutdown the server in order to increase storage capacity;

The storage being attached to a server can only be accessed by the attached server and can not be shared by other servers because the server's spare storage capacity can not be distributed across all servers within a organization;

Each attached storage system has to be managed separately and this is a nightmare for IT professionals;

With the attached storage system, the backup/restore has to go through the data network, this will tax or reduce the network performance;

A typical SCSI connection only allows a 12-meter distance for data accessing with 15 storage devices. Similarly, Fiber Channel is limited to 10 kilometers communication distance. Distance limitation effectively prevents them from being the best choice for disaster recovery of the storage system; and The Fiber Channel based storage system cannot handle well for the interoperability. Also, the Fiber Channel based storage system is expensive to build and to maintain.

Figure 8:
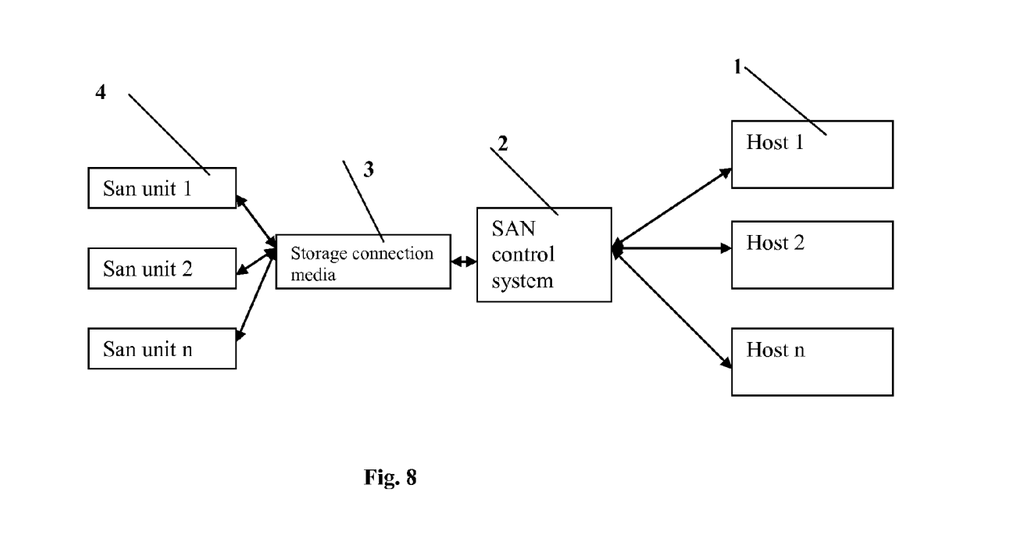
FIG. 8 is an In-Bound Accessed Virtual Storage System.

FIG. 8 shows a conventional type of the virtual SAN, which is in-band controlled and accessed with which the data path from hosts 1 to the SAN units 4 going through control management system 2. It is not efficient in term of accessing the data by the hosts because the virtual SAN control management system 2 can easily be a performance bottleneck. Similarly, the scalability of this type of the virtual SAN is poor.

SUMMARY

Figure 1:
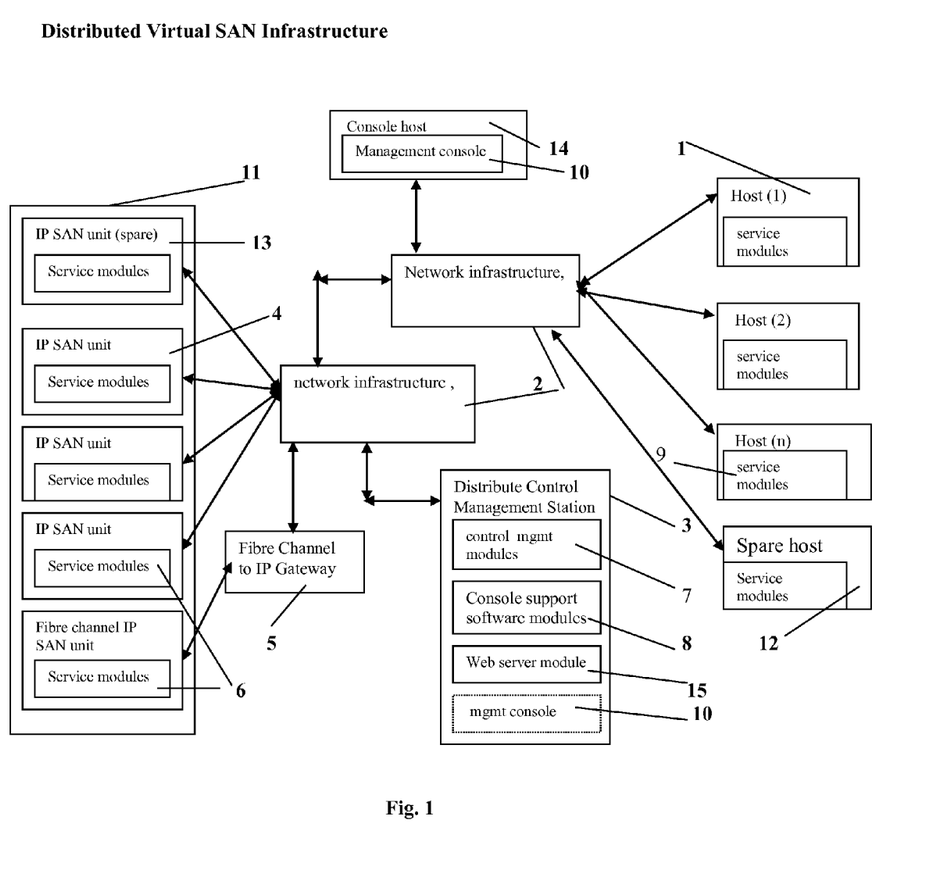
FIG. 1 illustrates a distributed virtual storage area of network ("SAN") infrastructure in accordance with one embodiment of this invention.

With rapid development of high speed communication technology, the problems mentioned above can be solved by an IP based out-band accessed distributed virtual SAN infrastructure illustrated in FIG. 1 of this invention. In one embodiment referencing to the FIG. 1, each host1 can directly access the IP based SAN units 4 without going through the control management station ("control system") 3. The IP based out-band accessed distributed virtual SAN actually represents an example of a central controlled distributed scalable virtual machine system (CCDSVM illustrated in FIG. 9. Wherein, each system units actually is a SAN unit 4, specifically is an IP based SAN unit.

Figure 6:
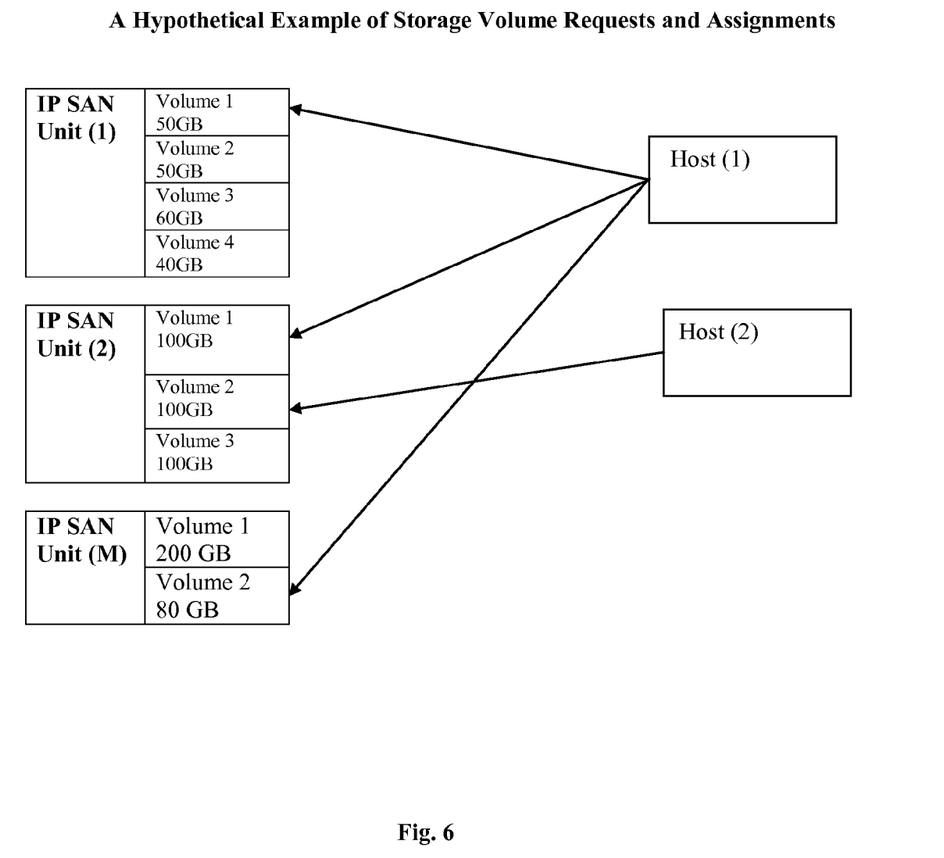
FIG. 6 illustrates a hypothetical example of Storage Volume Requests and Assignment in accordance with one embodiment of this invention.

In one embodiment, each SAN unit 4 of the distributed virtual SAN can be accessed by one or more hosts 1 and each host 1 can access one or more SAN units 4 as illustrated in FIG. 6. Therefore, every storage volume can be fully utilized without wasting a bit of capacity. In addition, the storage access goes directly through data communication link of a network infrastructure 2 between the hosts1 and SAN units 4 without involvement of the control system3. Further, a SAN unit 4 of the virtual SAN can be dynamically added or removed without interrupting other of the SAN units 4 being access by the hosts 1. In addition, all SAN units are centrally controlled, monitored, and managed by a control system 3 through a management console 10 on a console system14. The control system 3 may also accept storage volume/ partition requests from each host 1, and assign matched volumes/partitions of the SAN units 4 to these requested hosts 1. Therefore, each host 1 could directly and efficiently access the right volumes/partitions on assigned SAN units4 without interfering each other and without going through the control system again. In addition, the backup and restore will not go through data network, therefore, it will enhance the performance and flexibility for the backup/restore operations.

This invention will become understood with reference to the following description, claims, and accompanying figures.

BRIEF DESCRIPTION OF THE DRAWINGS

This invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The following terms are used through out this patent application to describe this invention. A central controlled distributed scalable virtual machine ("CCDSVM") system, in one embodiment, allows a control management system to control a group of systems and to provide distributed services to client systems over an Intranet, the Internet, and/or LAN environment. Storage media includes magnetic hard disk drives, solid state disk, optical storage drive, and memory card etc. Storage connection and control media may include controller of IDE, SCSI, Fiber optical, Ethernet, USB, or wireless media, and/or other related cables etc. Each controller of the storage media such as Raid, IDE, or SCSI controller may control multiple storage devices on a computing system. Storage system includes one or more storage media (devices), storage connection and control media. Storage system also contains related software modules for delivering storage services. A storage volume or partition is a unit of usable storage space having an unique storage address with a fixed size (length) being configured in a storage device.

Storage area network ("SAN") is a storage system that is capable of providing block data services to various computer devices through storage connection and control media, such as Fiber-optical, Ethernet or other said media using protocol based on Internet Protocol ("IP") or non-IP based protocols. The non-IP based connection and control media, in one example, includes Fiber-Channel. IP SAN unit uses IP based protocol to provide storage raw block data services. All discussions of the SAN in this invention are within the scope of a central controlled distributed scalable virtual machine ("CCDSVM").

DNS stands for domain name service for the Internet network. DNS is an Internet software infrastructure and is capable of identifying and resolving network addresses and name for computing systems across a network. A Simple Network Management Protocol ("SNMP") is a standard Internet protocol. A SNMP trap is a user datagram protocol ("UDP") packet, which may be used to send the SNMP message (a event) from a SNMP agent system to a SNMP network management station via network links.

FIG. 1 shows an example of a simplified block diagram of IP based out-band accessed distributed virtual SAN infrastructure. The distributed virtual SAN infrastructure includes multiple hosts 1, network infrastructures 2, a control management system 3, a virtual storage pool 11 having multiple SAN units including IP SAN unit 4, spared SAN unit 13 and fiber channel SAN unit 4 which connected via fiber-channel-to-IP gateway 5, and a management console 10 residing in a console host 14. In one embodiment, each host 1 contains service software modules 9. The service software modules 9 are configured to communicate with control management software modules 7 of the control management system 3 for obtaining information of the virtual SAN, for example to get the storage information on a specific SAN unit 4. The service software modules 9 of the host 1 also communicate with service software modules 6 of a SAN unit4 to read block data therefrom or write block data thereto. The service software modules9 can be coded and implemented with any suitable programming languages such as C, C++, Java or others. The service software modules9 may also use any suitable protocols such as IP based or non-IP based protocols.

Figure 10:
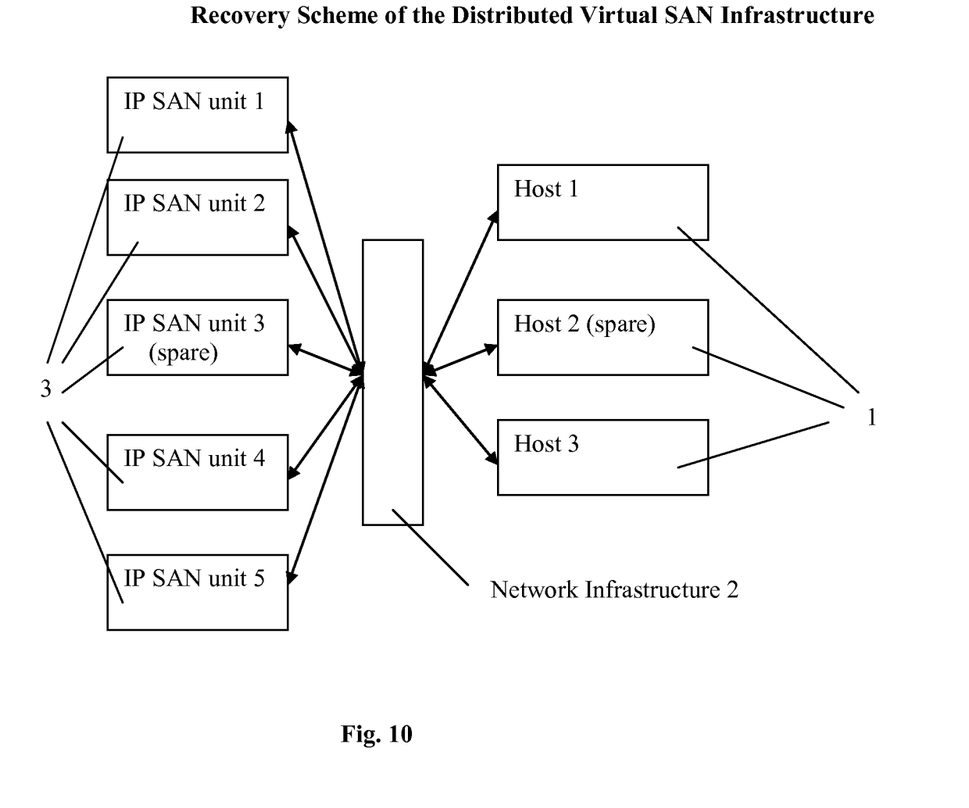
FIG. 10 illustrates a Simplified Diagram of Disaster Recovery Scheme of Distributed Virtual SAN Infrastructure in accordance with one embodiment of this invention.
Figure 11:
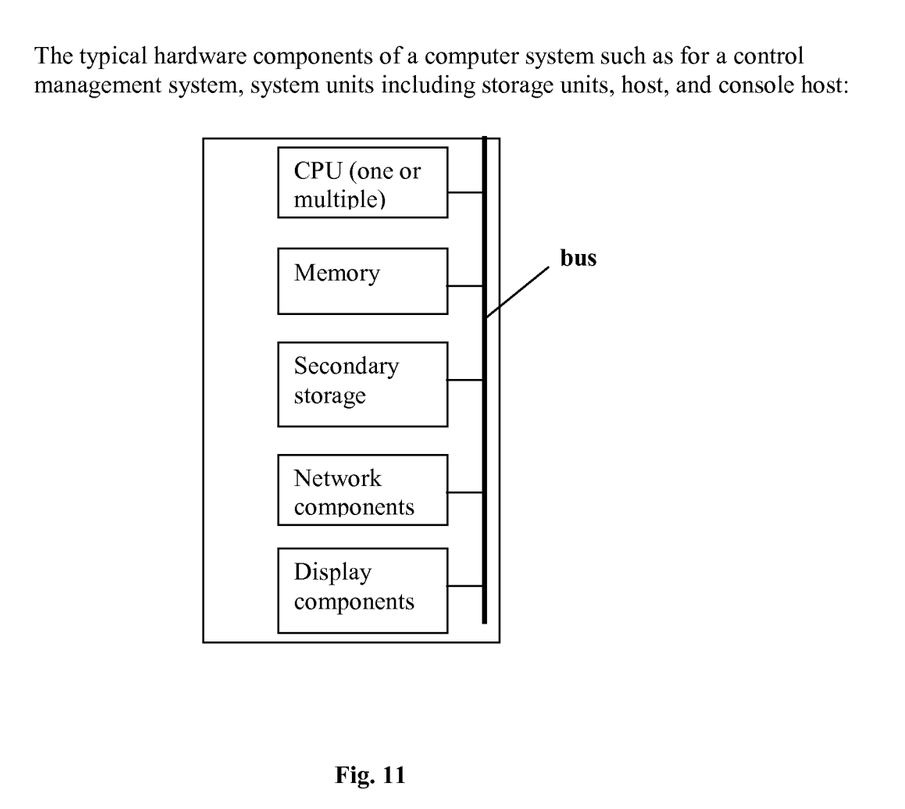
FIG. 11 illustrates typical hardware components of a typical computer system for said control management system 3, system unit such as storage unit of IP SAN unit 4 and spare IP SAN unit 13, host 1, and console system 14. It comprises one or multiple CPU, memories, secondary storages such as disk or memory sticks, network interface cards and display components such as monitors or others. These components are connected through bus or cable.

The host1, in one embodiment, could be a server, a desktop, a laptop PC, or a personal communication device such as a PDA or a cell phone or other, which is configured to access block data. In another embodiment, the host1 is capable of creating a local file system by utilizing at least a storage volume on a SAN unit 4 in addition to utilizing its own storage volume on its local storage device. In one more embodiment, the host1 may create a local database by utilizing at least a storage volume on a SAN unit 4 in addition to utilize its own local storage devices. In addition, at least one spare host 12 can be deployed in the virtual SAN infrastructure, where the spare host12 represents a part of recovery scheme that could be implemented for providing service replacement for a failed host 4 in the CCDSVM environment, and each spare host 12 can serve multiple hosts as illustrated in FIG. 10 of this invention.

Network infrastructure 2 can comprise various types of communication links. The network infrastructure could be one of a corporate storage network, a local area network ("LAN"), a corporate intranet, the Internet, a wide area network ("WAN") or other type of networks. In one embodiment, network infrastructure 2 includes switches, routers, gateways, cables (Ethernet, optical Fiber), wireless communication media, or others. The network infrastructure 2 provides data path between the hosts1, the distribute control management system 3, and the SAN Units4. The network infrastructure 2 also includes software infrastructure such as DNS or DHCP for facilitating each of computing systems on the network to identifying a target computing system's addresses for ease of sending or receiving data within a network domain or in a cross-domain network environment.

It should be noted that DNS and/or other Internet address identification mechanism may be used when a message or other data is sent from a system A to a system B via a communication link of the network infrastructure 2.

Control management system 3 includes distributing control management software modules7 and console support software modules 8. To support web-based console, it requires web server software modules 15. The distribute control management software modules 7, in one embodiment, communicate with the service modules 6 of a IP SAN unit 4 to retrieve storage information for constructing a virtual SAN storage pool11. The communication between the distributed control management software modules 7 and the service modules 6 of a IP SAN unit4 is further configured to monitor IP SAN unit 4, and to perform various system operations, which include storage configuration and partitioning and other operations. The control management software modules 7 also communicate with service software modules 9 of each of the hosts 1 for distributing storage volumes to the each of the hosts 1. The distribute control management software modules 7 can be implemented with any suitable programming languages such as C, C++, Java, XML, and/or others. The communication protocols between the control management system 3 and each of the IP SAN units 4 could be any suitable IP based protocols. The communication between the control management system 3 and the hosts 1 can be any suitable IP base or non-IP based protocols.

The console support software modules 8 employ inter-process communication mechanism to obtain information relating to the IP SAN units4 and the host 1 from the distributed control management software modules 7. The console support software modules 8 actually also plays a role for web server interface which operatively coupled to web server software modules 15 through the inter-process communication mechanism for providing web services and web user interfaces ("UI") that include sending information of the SAN units 4 and hosts 1 to a console system 14 for displaying the information via the management console 10. In one embodiment, the console support software modules 8 coupled to the web server modules 15 and the control management modules 7 for supporting web based multitasking, so that the control management system3 provides each user via a web browser on a computing device such as on a console system 14 to be capable of submitting one or multiple concurrent tasks for the CCDSVM without blocking or freezing the web browser screen displaying. In one example, a user space task list along with a lock protection can be used to store each task transmitted from each web browser.

In another embodiment, the following actions can be performed on the control management system 3 for supporting web multi-tasks: a) repeating in a loop to receive and parse one or more requested tasks from each web browser being executed on a computing device, and for each parsed task performing following steps: b) acquiring the lock that protects the user space task list, storing the task information into a not used entry of the user space task list, then releasing the lock; c) run the task into the background and to be distributed and executed on one or more targeted systems; d) providing a response web page including the task status back to the web browser without waiting for the completion of the task, where if the target system is a control system, then get status from the control system itself and if the targeted system is a system unit such as a IP SAN unit, then get the task status from the system unit; where the task status could be a failed status if the task execution failed, or can be the task executing status or a result status if there is needs; e) cleaning up the task information in the corresponding entry of the user space task list up on the completion of the task.

Therefore, the user is capable of checking the task status regardless if the task is finished or not, and of course in another embodiment the user is also able to submit other tasks since the web browser displaying screen will never freezing or blocking. In one more examples, more locks may be deployed during the entire task executing to protect other resources related to the task. In another embodiment, non-web based networked user interface can be supported with similar steps described above. The console support software modules 8 and web server software modules 15 can be implemented with any suitable programming languages such as C, C++, Java, XML, and others.

The web server software 15 communicates with the management console software 10 on the console host 14 through web protocol such as HTTP for displaying the information of the virtual SAN infrastructure via the management console 10 (web browser) on the console host. The web server software 15 together with the console support modules 6 and the distributed control management modules 7 are configured to provide end users a centralized management capability for managing the entire distributed virtual SAN infrastructure across the network. The web server software 15 could be commercially available software on the market such as Apache or IIS or other proprietary software.

To simplify foregoing discussion, the communication path mentioned above will be simply referred to as the console support software modules 8, which communicate (send/receive data) with the management console 10 on the console host 14 without further mentioning the role and function of the web server software 15 on the control management system 3.

In addition, to support non-web based console, the web server software 15 on the control management station 3 is often not required. In this case, the console support software modules 8 could communicate with the management console software 10 with a suitable protocol other than a web protocol such as HTTP.

Figure 5:
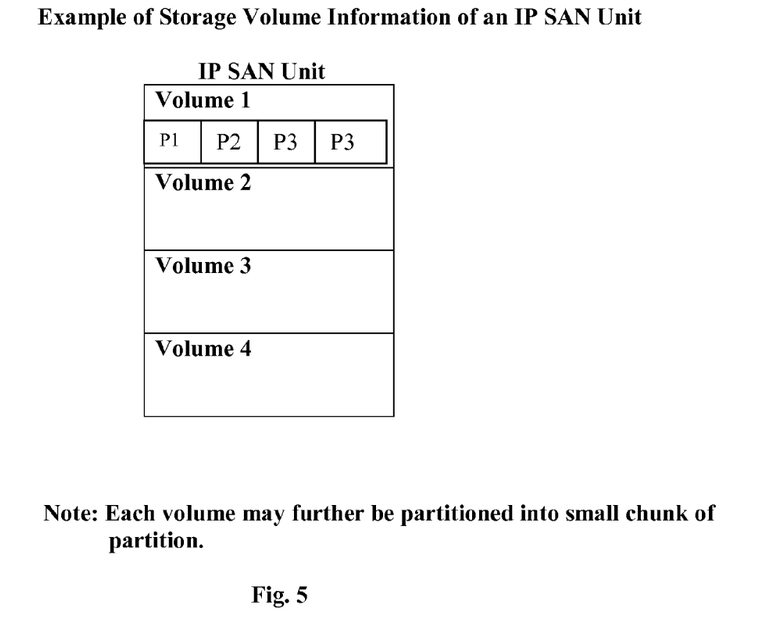
FIG. 5 illustrates an Example of Storage Volume Information of an IP SAN Unit in accordance with one embodiment of this invention.

The virtual storage pool 11 includes multiple SAN units 4 such as IP SAN and fiber channel SAN units, where each SAN unit 4 further includes service modules 6. Each SAN unit 4 further contains storage media, storage communications and control media. The storage media of each SAN unit 4 is configured to have one or more logical volumes. Each volume, in one embodiment, is further partitioned into several portions, as shown in FIG. 5. The service software modules 6 of the SAN unit 4 provide block data services and other service. The service software modules 6, in one embodiment, is configured to communicate with the distribute control management station 3 for providing storage information and for performing storage operations based on received request. The service software modules 6, in another embodiment, are further configured to communicate with the service software modules 9 of hosts 1 for providing block data services directly to the host 1. The service software modules 6 can be implemented by any suitable programming languages such as C, C++, Java, or others and they may employ any suitable IP based communication protocols for data read and write. Each mentioned software modules comprises programming instruction codes which are capable of creating processes and threads to be executed by the mentioned computer system step by step for carrying out one or more designated tasks.

In one embodiment, the control management system 3 organizes the SAN units 4 to form the virtual storage pool 11. The information of the virtual storage pool 11 is kept and maintained via a SAN unit information list in which every entry on the list comprises the information of a storage unit 4 including its name, IP addresses, status, and the storage volumes, each volume's block data addresses and size for each SAN unit 4. The presence of a spare IP SAN unit 13 represents a part of recovery scheme used in the central controlled distributed scalable virtual machine environment.

Fiber channel to IP gateway 5 is a component that is configured to provide translation between Fiber Channel based protocol and IP based protocol so that Fiber Channel based SAN unit 4 will appear as if it is a IP based SAN unit to the control management system 3 and host 1.

Fiber channel SAN unit 4 is similar to an IP SAN unit 4 except it uses Fiber Channel storage control media and uses Fiber Channel protocol to communicate with other parties over the network. In addition, Fiber Channel SAN unit 4 appears as an IP based SAN unit 4 once it connects to a Fiber Channel to IP gateway 5 in the network infrastructure 2 of the distributed virtual SAN infrastructure. Therefore, to simplify the foregoing discussion, the fiber channel SAN unit 4 will be treated similarly as an IP SAN unit 4 in the virtual storage pool and in all of following discussion without additional comments.

The web based multi-tasking support for management console (web browser) 10 on the console host (14) of the CCDSVM has been described in the pending patent application entitled "Concurrent Web Based Multi-Task Support for Control Management System" application Ser. No. 12/079,482, filed on Mar. 27, 2008 by the same author of present invention, and here in incorporated in its entirety by reference. The management console 10 could be a commercially available web browser 10 on the market or a proprietary Web browser 10. A web browser 10 is operable to communicate with the web server software 15 of the control management station 3 through a web protocol such as HTTP. The Web browser could be implemented by any suitable programming languages such as C, C++, Java, XML, and others. In addition, the management console software module 10 could be a networked software module instead of web browser software for supporting non-web based management console 10. In this case, any other suitable network protocols can be used instead of using web protocols such as HTTP.

To simplify the foregoing discussion, the communication path between management console 10 of the console host 14 and the console support software modules 8 of the control management system 3 will not further mention the role or function of web server software module 15 in this invention.

From management console 10, multiple system operations and tasks can be performed concurrently for the entire distributed virtual SAN infrastructure. There are may be one or more management consoles 10 of distributed virtual SAN infrastructure anywhere on the network infrastructure.

Figure 2:
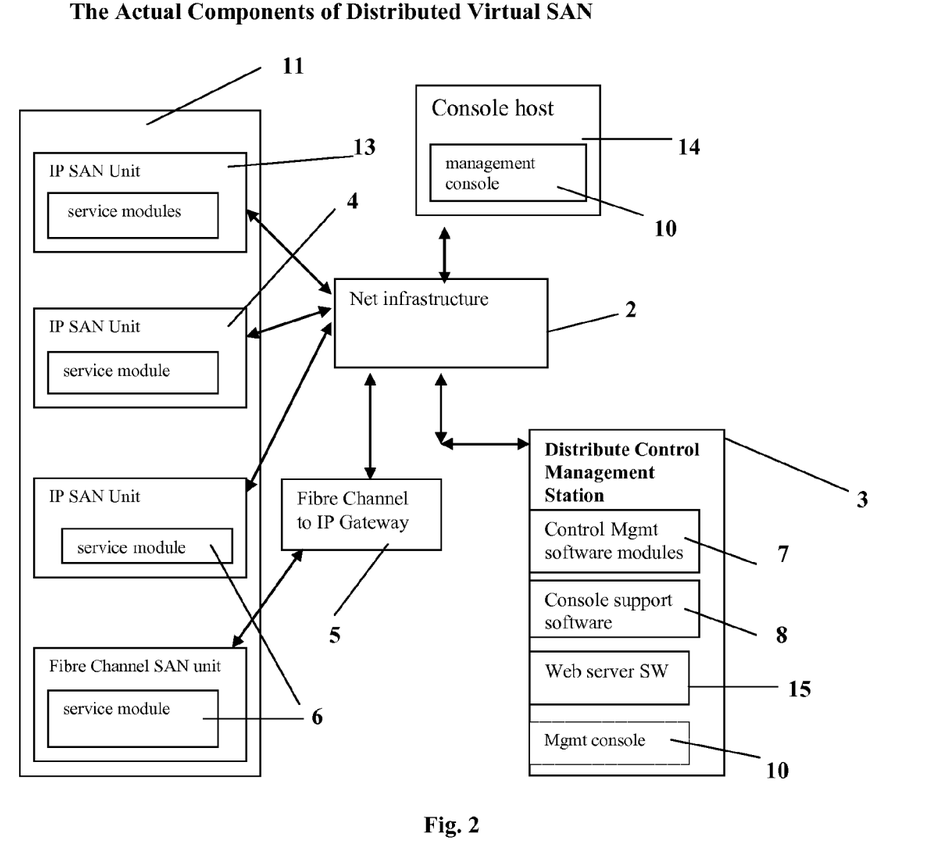
FIG. 2 illustrates actual Components of Distributed Virtual SAN in accordance with one embodiment of this invention.

FIG. 2 illustrates a portion of FIG. 1 relating to the core part of the virtual SAN. The multiple SAN units 4 form a virtual Storage pool 11. The virtual storage pool 11 may contain information of each SAN unit's IP address, the storage volumes and their sizes, and others.

Figure 3:
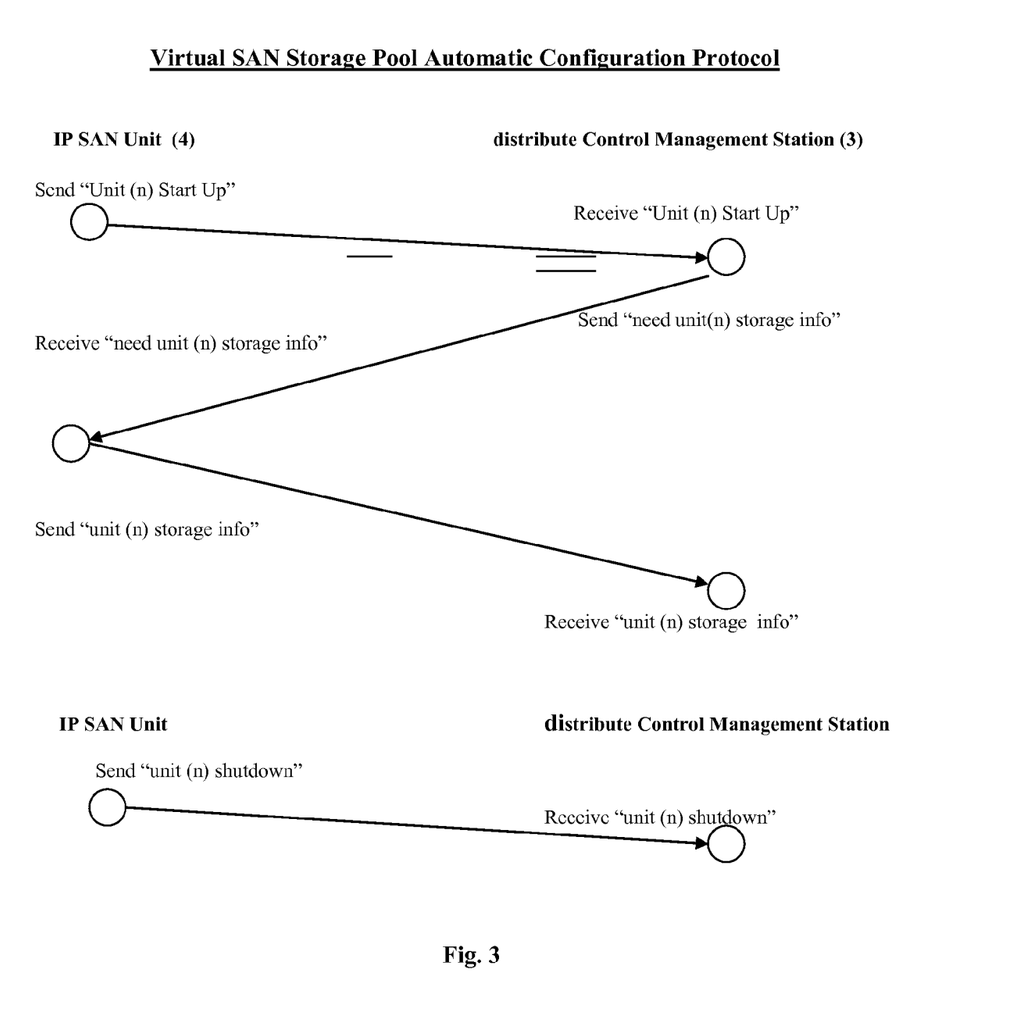
FIG. 3 illustrates Virtual SAN Automatic Configuration Protocol in accordance with one embodiment of this invention.

FIG. 3 shows a protocol for virtual SAN automatic configuration and building as well as for shutting down a SAN unit 4. The packet format used with this protocol is described in FIG. 4.

Figure 4:
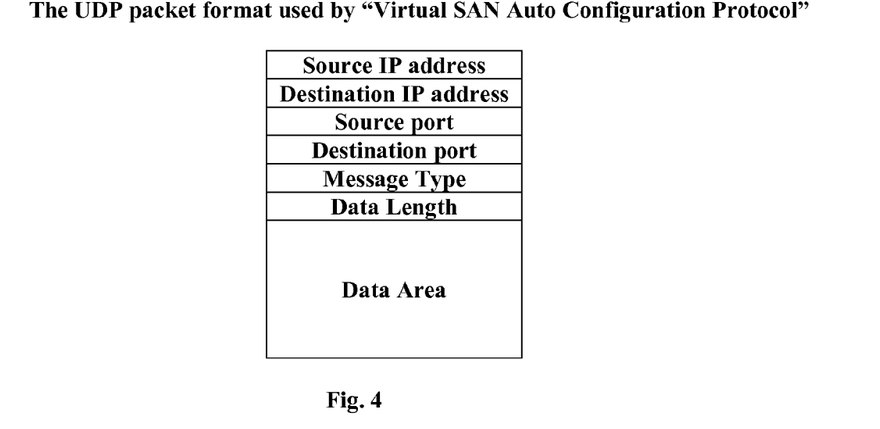
FIG. 4 illustrates a Virtual SAN Auto Configuration Protocol Packet format in accordance with one embodiment of this invention.

FIG. 4 shows the communication packet format, which is used by "Virtual SAN Automatic Configuration Protocol" for sending and receiving messages via a packet. Since the source and destination IP address and communication ports are included in a same packet, therefore, the storage communication can be independent of said naming identification mechanism such as DNS in this invention.

FIG. 5 illustrates a storage layout in an IP SAN unit, wherein the storage layout may be further divided into multiple volumes and each volume may be further divided into multiple partitions. Each volume refers to a logical storage unit in this discussion and it might contain one or multiple pieces of storage spaces from one or multiple storage hardware media.

FIG. 6 is a simplified and a portion of FIG. 1, which shows a hypothetical example of how hosts are configured to access the Storage Volumes of SAN units 4. Where each SAN unit 4 is a portion of virtual storage pool 11 and each host 1 is presented in the FIG. 1.

FIG. 8 is a block diagram illustrating an In-Band Accessed Virtual SAN. FIG. 8 shows another type of virtual SAN, wherein, the actual storage data path from hosts to IP SAN units has to go through control management station.

Figure 9:
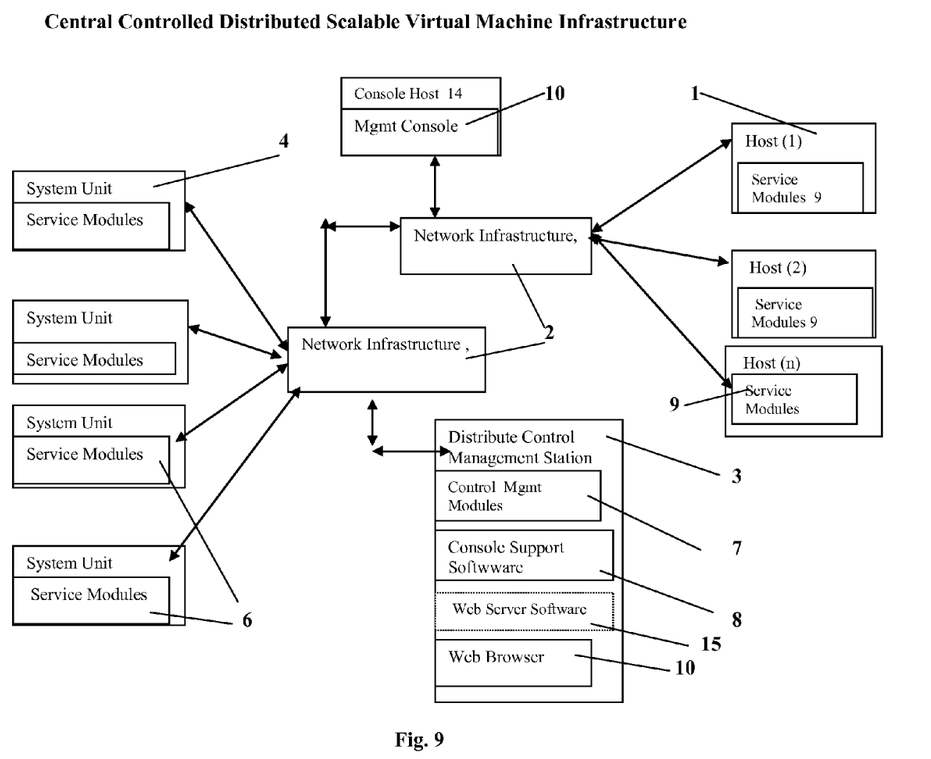
FIG. 9 illustrates a Simplified Diagram of Central Controlled Distributed Scalable Virtual Machine System in accordance with one embodiment of this invention.

FIG. 9 is a simplified diagram of the central controlled distributed scalable virtual machine. With this invention, the computing systems in a CCDSVM can be flexibly organized into multiple different service pools according to their functionalities. For example, system units 4 such as multiple IP SAN units 4 can form a virtual SAN storage pool. The hosts 1 of the CCDSVM could form other service pools each of the pools to provide service such as video services, security monitor services, database service, file service, web service and all other services provided across the world wide web or cross other type of communication network. In an additional embodiment, multiple NAS ("network attached storage") units 4 can form a virtual NAS storage pool, wherein each NAS can provide at least a local file system residing in the NAS to at least a remote host which deploys the NAS' local file system remotely as if it is the host's local file system via communication to the NAS unit. Also, all service pools of the CCDSVM shall have similar advantages as the virtual SAN storage pool has, such as automatic configuration and provisioning, dynamic capacity scaling and expansion by adding or removing one or more system units dynamically, improved performance, backup and restore, fault handling and disaster recoverability, multi-level security control, centralized manageability, and support on-demand services to the client (host) systems 1.

FIG. 10 is a embodiment of a disaster recovery scheme of the distributed virtual SAN infrastructure, which includes one virtual storage pool 11 of multiple SAN units 4 and one service pool of multiple hosts 1. For example, host-1 1 can access to IP SAN unit-1 4 and IP SAN unit-2 4 while host-3 1 is configure access to IP SAN units-4 4 and IP SAN unit-5 4. Also, IP SAN unit-1 and uni-2 are mirrored so that they have kept the same copy of data for the host-1 1. Therefore, whenever one of IP SAN failed, the mirrored one can continue providing storage service to the host as commonly practiced in the industry. The same to be true for IP SAN unit-4 and unit-5 with host-3 1. That is the IP SAN unit 4 and 5 are mirrored so that they have kept the same copy of data for host-3 1. In addition, a IP SAN unit-3 4 may be a spare unit to provide fault replacement when a mirroring IP SAN unit having fault and a host-2 1 could be a spare host for providing fault replacement when any one of the host-1 or host-3 having fault occur.

FIG. 1 shows a simplified diagram of a distributed virtual SAN infrastructure according to this invention. With the distributed virtual SAN infrastructure, the distributed virtual SAN storage pool 11 comprises one or more SAN units 4, which may be further connected to a distribute control management station 3. The SAN units 4 can be accessed by one or more hosts 1 via the network infrastructure 2. The entire distributed virtual SAN infrastructure can be operated through the management console 10 on the console system 14.

A hundreds and thousands terabytes of a virtual storage volume pool 11 of the distributed virtual SAN infrastructure can be constructed and updated when each of the SAN units 4 is booted up or brought to online. The virtual storage volume pool 11, in one embodiment, is updated when at least one of SAN unit is powered down or removed from the distributed virtual SAN infrastructure. FIG. 3 shows one embodiment of the distributed Virtual SAN Automatic Configuration Protocol, which leads to the success of constructing the virtual storage pool 11 of the distributed virtual SAN infrastructure according to this invention. The following are automatic sequence steps for building the storage volume pool 11 of the virtual SAN based on this protocol illustrated in the FIG. 3. The protocol described bellow could utilize IP based protocol such as SNMP, or a much simple UDP protocol as illustrated in FIG. 4, or any other suitable protocols.

In one embodiment, when any IP SAN unit 4, such as a unit labeled with (n), is brought up online, the SAN service modules 6 of the IP SAN unit 4 sends out a "SAN unit (n) startup" packet to indicate either the SAN unit is power up or a previously downed network is up again, to the distribute control management system 3. The "SAN unit (n) startup" packet could be a simple user defined UDP packet illustrated in the FIG. 4 with a message type of system up. This message carried by the packet could also be a SNMP trap of cold start packet, or link-up packet or other short packet/ message of any suitable IP protocols.

When the distribute control management modules 7 of the distribute control management system 3 receives the IP SAN unit (n)'s packet, it stores the IP SAN unit (n)'s information into a SAN unit information list on the distribution control management system 3.

After storing the information of the IP SAN unit (n) into the SAN unit information list, the control management modules 7 of the distribute control management system 3 sends back a packet of "need SAN unit (n)'s storage info" to the IP SAN unit (n) 4.

When the SAN service modules 6 of the IP SAN unit (n) 4 receive the packet of "need SAN unit (n)'s storage info", it obtains the storage information of the IP SAN unit (n) 4 and encoded the obtained information into a packet as illustrated in FIG. 4, which includes the number of storage volumes, each volume's starting address (logical block data address, LBA), length, and the end address (logical block address, LBA). The SAN service modules 6 then send the packet of "unit (n) storage info" back to the control management system 3.

After receiving the "unit (n) storage info" packet from the IP SAN unit (n) 4, the distribute control management modules 7 of the distribute control management system 3 updates the stored SAN unit information list for the virtual storage pool 11 with the corresponding storage information of the IP SAN unit (n) based on the received information from the packet.

When any one of IP SAN unit (n) is shutting down or a communication link of a IP SAN unit (n) is down, the service module 6 of the IP SAN unit (n) 4 sends a "Unit (n) shutdown" packet to the distribute control management system 3. This shutdown packet could be an SNMP trap of link down, or a simple UDP packet illustrated in FIG. 4 with a message type of system down, or could be other short packet based on some other protocols.

After receiving the "unit (n) shutdown" packet from the IP SAN unit (n) 4, the distribute control management modules 7 of the distribute control management system 3 updates the information of the virtual storage pool 11 via the SAN unit information list for the specific IP SAN unit (n) 4, where in one embodiment the updated information could be the total size of the capacity of the virtual storage pool, could be the hosts' storage volume allocation (mapping) information, and could be the status down for the SAN unit (n). The method and principles of automatic constructing the virtual storage pool 11 can be applied for various other virtual machines such as for virtual video server, database server, web server, file server, etc. without limits; For one example, the SAN unit described above may be replaced by a video server, and the "storage info" in the packet for the protocol sequence can be replaced with the "video service info" etc. for constructing a different type of service pool such as for a virtual video pool or a virtual database pool and other pools.

After one or more SAN units 4 are online, and the control management system 3 obtains and stores the information relating to the storage volumes for every SAN unit 4 in the virtual storage pool 11. Therefore, the control management system 3 is able to accept block data request from a plurality of hosts 1 and redirect and distribute the requested storage volumes in the virtual storage pool 11 to each requested host 1 in several steps as follow.

First, as illustrated in FIG. 6, in one embodiment a host-1 1 sends a request to the control management system 3 for requesting a specific sized storage space, such as 80 GB (gigabyte) of storage. Second, the control management system 3 receives and stores the host-1's information and searches for the availability of 80 GB of storage volume of a specific SAN unit 4 in the virtual storage pool 11. The control management system 3, for example, identifies a volume 2 which is 80 GB in size and is available for service on a SAN unit-M. Third, the control management system 3 sends the information of the host-1 to the SAN unit-M, wherein the information includes the IP address of the host-1, the requested storage size and the identified storage volume. The control management system 3 also sends the identified storage volume information relating to the SAN unit-M to the host-1 1, wherein the storage volume information includes the IP address of IP SAN unit-M, the volume number and the size, the volume's starting address, and volume's ending logical address block (LBA). Therefore, all parties of three, namely the control management system 3, the host-1 and the SAN unit-M keep and synchronize the same storage volume assignment and mapping information for the SAN unit information list. Fourth, once the host-1 1 and the SAN unit-M get each other's information, the host-1 1 can directly and independently access the volume 2 on the SAN unit-M immediately and the SAN unit-M, in one embodiment, is further configured to perform security checking in light of storage access based on the received mapping information.

Alternatively in another embodiment, the above described steps may also be semi-automatically setup with assisting of system operations performed from the management console 10 on a console system 14. For example, an administrator could initially setup volume 2 of the SAN unit-M to be exclusively accessible by the host-1 1 as long as the administrator acknowledges that host-1 needs such size of storage volume. The administrator can also setup the host-1 with all information needed to access the volume 2 of the SAN unit-M. Finally, the host-1 1 can access to the volume 2 of SAN unit-M directly without going through the control management system 3.

This invention also discloses a mechanism of dynamically scaling storage capacity. After the distributed virtual SAN storage pool 11 is built, the host 1 will access to the storage volumes of the SAN units 4 allocated to the host 1 via the virtual storage pool 11 directly without further involvement of the control management system 3. Therefore, the control management system 3 can continue to handle adding one or more storage unit 4 for the virtual storage pool 11 of the distributed virtual SAN infrastructure based on-demand without interrupting each of the hosts' 1 normal access to the storage volumes on the assigned SAN units 4. As a result, this guarantees that the distributed virtual SAN storage pool 11 can be dynamically expanded without interrupting the normal operations and access of the entire distributed virtual SAN storage infrastructure 11.

This invention further discloses a technique of providing scalable storage for each host 1. As illustrated in FIG. 6, once the distributed virtual SAN storage pool 11 is constructed, in one embodiment each host 1 can access to one or more SAN units 4 in the storage pool 11 of the distributed virtual SAN infrastructure whenever the host 1 made a storage request. For example, a host 1 can access to SAN unit-1, unit-2, and unit-M after the host 1 made requests for access to storage volumes from the IP SAN units 4 and the control management system 3 subsequently granted each of the requests. This effectively provides scalable storage system for each host 1 within the distributed virtual SAN infrastructure of this invention. Further, the distributed virtual SAN infrastructure provides far better scalability than the in-band accessed virtual SAN illustrated in FIG. 8, wherein the scalability of in-band accessed virtual SAN were severely limited by a bottlenecked control management system.

The present invention also discloses a method of storage sharing mechanism. Once the distributed virtual SAN storage pool 11 is built, in one embodiment, each SAN unit 4 in the storage pool 11 of distributed virtual SAN infrastructure may hold multiple storage volumes in the form of block data, which can be accessed by one or more hosts 1. Therefore, this allows multiple hosts 1 to share an IP SAN unit 4 by granting and assigning each host to exclusively access particular one or more storage volumes on that IP SAN unit 4. The FIG. 6 demonstrates such an example of the storage sharing, where IP SAN unit 2 has three volumes, which named volume 1, volume 2, and volume 3. The block data service modules 6 of the IP SAN unit 2 allows volume 1 to be accessed exclusively by host-1 1 while volume 2 to be accessed exclusively by host-2 1.

With in-band accessed virtual SAN illustrated in FIG. 8, the control management system could be a performance bottleneck. With distributed virtual SAN of this invention, each host 1 can directly and independently access to any IP SAN unit 4. Therefore, the performance of storage access for each host 1 will not suffered from the bottleneck and can match the performance of direct attached storage system illustrated in FIG. 7 when a high speed network connection is deployed in the distributed virtual SAN infrastructure.

The present invention also illustrates a method of a centralized management of the distributed virtual SAN. The management console 10 on the console host 14 or on the distribution control management system 3 is configured to display a web UI (user interface) to comprise information about all IP SAN units 4 and hosts 1 receive from the control management modules 7 via communication to the console support software module 8 of the control management system 3. Therefore, through the information displayed in the management console 10 on the console system 14, users can perform centralized management tasks for the entire distributed virtual SAN storage pool 11, the hosts 1, and the control management system 3, where the tasks can be performed by using web operation menu. With multiple concurrent tasks support that controlled by the console support software module 8 of the control management system 3, the users at the management console 10 can perform full range of system operations and tasks, where the management console 10 could be a web browser or a non-web based networked console. The mentioned tasks include, for example, creating a file system on a storage volume such as a 60 Giga bytes sized file system, configuring a RAID controller, or transfer one or more files between systems of the CCDSVM including multi-Giga Bytes of file.

These management tasks also include storage configuration, storage volume allocation (assignment) or de-allocation for hosts, storage partitioning and repartitioning, storage, network, and resource usage and activity monitoring, security management, data replication and backup/restore management, fault management and all others. The security management includes setup secure access credentials at multiple levels of the virtual SAN infrastructure including at control management system level, at SAN unit level and at host level. The security also can be enforced for users performing administration tasks. For example, authenticating and validating a specific user from a specific system's web browser to access the virtual SAN infrastructure, authenticating a user performing specific task for one or more specific systems such as for SAN unit, host or control management system. For other example, assigning and authenticating a host access to one or more specific SAN units' specific storage volumes, and assigning storage volumes of a SAN unit to be accessed by specific one or more hosts.

In one embodiment, the present invention discloses a method for disaster recovery. The use of DNS or IP address identification mechanism provides the distributed virtual SAN infrastructure with capability of overcoming the geometric (region) limitation in a cross network domain environment or in a single network domain environment. Therefore, the SAN units, hosts and the control management station could be flexibly clustered on a corporate storage network, a corporate Intranet, LAN, WAN or the Internet. As a result, a disaster recovery plan can have a topology of the distributed virtual SAN infrastructure span across 100 miles range across the Internet or Intranet as oppose to the traditional 10-kilometer limitation in a fiber channel environment.

In addition, the disaster recovery plan of the distributed virtual SAN infrastructure can be flexibly implemented according to an embodiment illustrated in FIG. 10. With this recovery plan, in one embodiment, the host-1 or host-3 can continue to operate even if one of its mirrored IP SAN units 3 failed. Also, a spare IP SAN unit 4 can be used to quickly replace a failed IP SAN unit 4 whenever there is a need, for example, when both IP SAN-1 and IP SAN-2 are failed. On the other hand, the hosts also can be organized into a service pool for providing special services, such as distributing video services, distributed database pool, distributed security monitor services, web services and all other services provided across the network or the world wide Web. Therefore, whenever the host-1 or host-3 is failed, the spare host-2 can quickly take over the assigned IP SAN storage unit to replace a failed host1 or host-3 to continue providing the services.

It should be noted that the storage of any IP SAN unit can be shared and accessed by multiple hosts. To scale up a host's storage, the host can be assigned to access multiple storage volumes from at least a SAN unit 4.

The implementation of the web-based multi-concurrent tasks support allows the entire distributed virtual SAN infrastructure to be managed and monitored much efficiently from a management console 10 on a console host 14 or on a control management system 3. Specially, many tasks and operations could be ranged from managing storage configuration and managing networks to configuring each computing system of the virtual SAN infrastructure to provide various services to the client systems across the network. Also, the IP based distributed virtual SAN infrastructure is one type of the central controlled distributed scalable virtual machine (CCDSVM).

Due to the ability control web based multi-tasking and the ability of controlling security and controlling user performing various tasks, the software modules of the CCDSVM has created a web based virtual computer user work environment (WCUWE) for a virtual operating system of the CCDSVM. The WCUWE created by the mentioned software modules (control part of the WCUWE) on the control management station 3 which includes console support software modules (web server interface) 8, control management modules 7 and web server software modules 15 on the control management system 3, and together by the service modules 8 (agent part of the WECUWE) on each system unit 4. Like the computer user work environment (CUWE) running on top of a native operating system kernel, each part of the WCUWE also running on the top of a native operating system kernel.

In one embodiment, a single standalone control system is a special embodiment of the CCDSVM, where the CCDSVM has degenerated into a single standalone control system 3 without any system unit 4.

Figure 12:
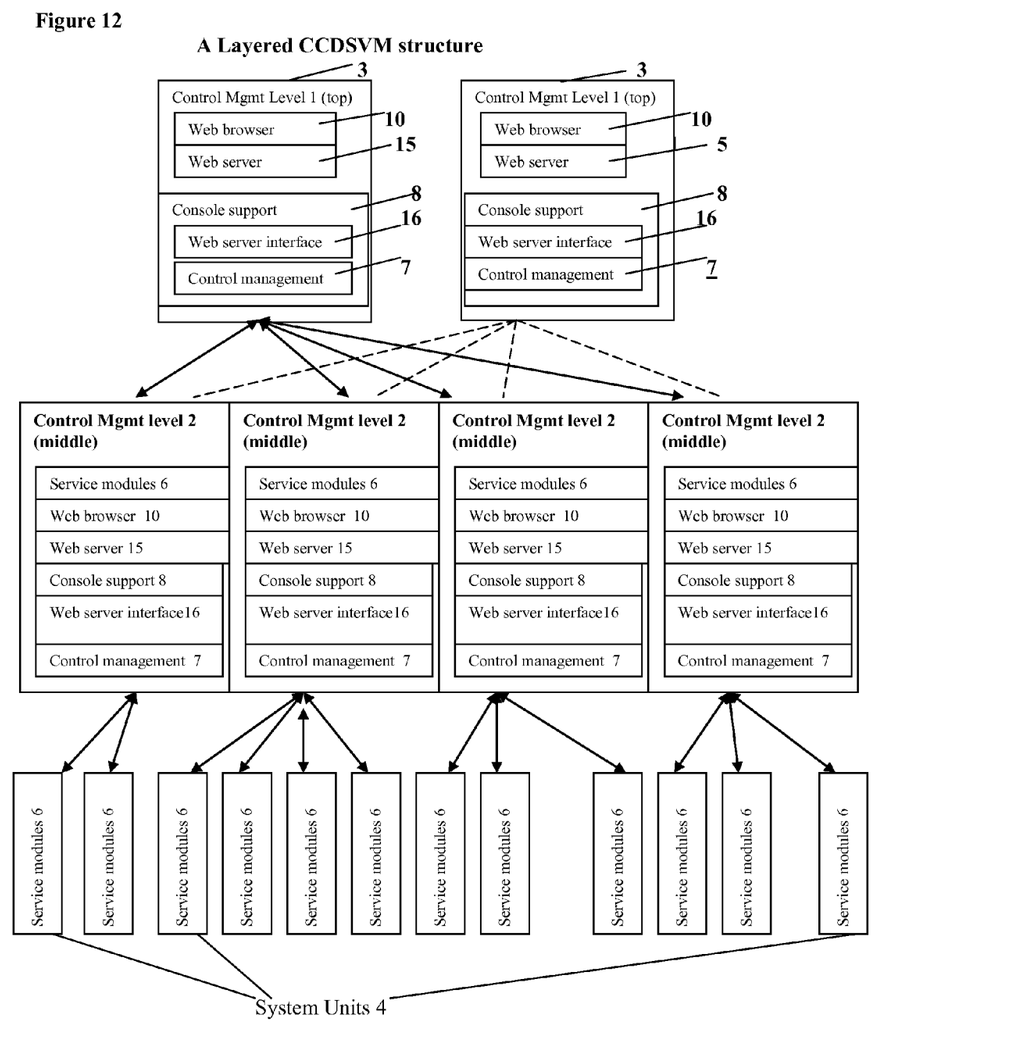
FIG. 12 illustrated an embodiment of a multi-layered central controlled distributed scalable virtual server, where a top level control system controls one or more middle level (level-2) control systems and each middle level control system can control s plurality of system units such as IP SAN units and spare IP SAN units. Therefore, the level 2 control system must have related software modules for both the control system and system unit 3 such that the middle level control system has double roles including a role as a system unit to the top level control system for executing a request received therefrom and sending response thereto, and a role as the control system to control the system units bellow its level.

In another embodiment, one or more service pools of the CCDSVM can be organized into multi-layered structure as illustrated in FIG. 12, where a top level control system controls one or more middle level (level-2) control systems and each middle level control system can control a plurality of system units such as IP SAN unit and spare IP SAN unit. Therefore, the level 2 control system must have related software modules for both the control system and system unit 3 such that the middle level control system has double roles including a role as a system unit to the top level control system for executing a request received therefrom and sending response thereto, and a role as the control system to control the system units bellow its level.

What is claimed is:

1. A method for scaling a hierarchical system, comprising:
   configuring the hierarchical system to comprise at least one top level control server, a first middle level control server and a plurality of third level servers connected across a network infrastructure,
   wherein the top level control server automatically adds the first middle level control server into a control pool, and the first middle level control server automatically adds each of the third level servers into a first service pool;
   scaling up the hierarchical system, including to:
      construct automatically a second service pool of a plurality of third level servers by a second middle level control server upon which receiving service information from each of the third level servers via executing a service pool construction protocol; and
      add automatically the second middle level control server into the control pool by the top level control server upon which receiving information from the second middle level control server via executing a service pool construction protocol,
      wherein the top level control server controls centralized operations for all servers at all levels in the hierarchical system, and
      wherein the first middle level control servers controls centralized operations only for the third level servers in the first service pool, and the second middle level control servers controls centralized operations only for the third level servers in the second service pool.

2. The method of claim 1, wherein said receiving service information from each of the third level servers further comprises: receiving storage information, including information of storage volumes from the each of the third level servers, the information of the storage volumes including starting address and size for each of the storage volumes.

3. The method of claim 1, wherein said receiving service information from each of the third level servers further comprises: receiving file system information, including information of folder structure from the each of the third level servers.

4. The method of claim 1, wherein the top level control server adds the first middle level control server into the control pool via executing a service pool construction protocol, and the first middle level control server adds each of the third level servers into the first service pool via executing a service pool construction protocol.

5. The method of claim 1, wherein the third level servers in each of the first and second service pools are physically clustered on said network infrastructure of the Internet, a corporate intranet, a local area network or a wide area network, and wherein the middle level control servers in the control pool are physically clustered on said network infrastructure.

6. The method of claim 1, each of the top and middle level control servers comprises at least one control module designated for automatically collecting information from corresponding servers at one level below via executing a service pool construction protocol, and comprises another control module for processing each task received from each client device.

7. The method of claim 6, wherein each of the first and second middle level control servers and the third level servers in the first or second service pool comprises at least one service module designated for automatically sending self information including internet protocol (IP) address to a corresponding control server at one level up via executing a service pool construction protocol, and another service module for processing a task received from a corresponding control server at one level up.

8. A hierarchical system comprising:
at least one top level control server, a first middle level control server and a plurality of third level servers connected across a network infrastructure,
wherein the top level control server automatically adds the first middle level control server into a control pool, and the first middle level control server automatically adds each of the third level servers into a first service pool; wherein
the hierarchical system is configured to seal up, including to:
construct automatically a second service pool of a plurality of third level servers by a second middle level control server upon which receiving service information from each of the third level servers via executing a service pool construction protocol; and
add automatically the second middle level control server into the control pool by the top level control server upon which receiving information from the second middle level control server via executing a service pool construction protocol; and
wherein the top level control server controls centralized operations for all servers at all levels in the hierarchical system, and
wherein the first middle level control servers controls centralized operations only for the third level servers in the first service pool, and the second middle level control servers controls centralized operations only for the third level servers in the second service pool.

9. The hierarchical system of claim 8, wherein the third level servers in each of the first and second service pools are physically clustered on said network infrastructure of the Internet, a corporate intranet, a local area network or a wide area network.

10. The hierarchical system of claim 8, wherein the middle level control servers in the control pool are physically clustered on said network infrastructure of the Internet, a corporate intranet, a local area network or a wide area network.

11. The hierarchical system of claim 8, wherein said controlling centralized operations for all servers at all level in the hierarchical system comprises: causing to display the control pool and the first and second service pools on an operation console for said centralized operations.

12. The hierarchical system of claim 11, wherein said controlling centralized operations for the third level servers comprises: causing to display the first or second service pool on an operation console for said centralized operations.

13. The hierarchical system of claim 12, wherein each of the top and middle level control servers is configured operatively to cause displaying self information on an operation console for said centralized operation.

14. The hierarchical system of claim 8, wherein said receiving service information from each of the third level servers further comprises: receiving storage information, including information of storage volumes from the each of the third level servers, the information of the storage volumes including starting address and size for each of the storage volumes.

15. The hierarchical system of claim 8, wherein said receiving service information from each of the third level servers further comprises: receiving file system information, including information of folder structure from the each of the third level servers.

16. The hierarchical system of claim 8, wherein each of the first and second service pools is one of a video service pool, web service pool, storage service pool, file service, or database service pool and is displayed as a list on an operation console.

17. The hierarchical system of claim 8, wherein each of the top and middle level control servers comprises at least one control module designated for automatically collecting information from each of corresponding servers at one level below via executing a service pool construction protocol, and another control module for processing each task received from each client device.

18. The hierarchical system of claim 17, wherein each of the first and second middle level control servers and the third level servers in each of the first and second service pools comprises at least one service module designated for automatically sending self information including internet protocol (IP) address to a corresponding control server at one level up via executing a service pool construction protocol, and another service module for processing a task received from a corresponding control server at one level up.

19. The hierarchical system of claim 8, wherein the top level control servers further updates the control pool whenever the first or second middle level control server being shutdown or disconnected, or a new third middle level control server joining the control pool via executing a service pool construction protocol.

20. The hierarchical system of claim 8, wherein each of the first and second middle level control servers further updates corresponding service pool whenever a third level sever thereof being shutdown or disconnected, or a new third level server joining the corresponding service pool via executing a service pool construction protocol.

* * * * *